United States Patent
Chamarajnager et al.

(10) Patent No.: US 11,665,052 B2
(45) Date of Patent: *May 30, 2023

(54) INTERNET OF THINGS GATEWAY ONBOARDING

(71) Applicant: VMware, Inc., Palo Alto, CA (US)

(72) Inventors: Ravishankar Chamarajnager, Atlanta, GA (US); Niranjan Maka, Union City, CA (US); Glen McCready, Palo Alto, CA (US); Greg Bollella, Palo Alto, CA (US); Vasudev Yendapally, Alpharetta, GA (US)

(73) Assignee: VMWARE, INC., Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/306,180

(22) Filed: May 3, 2021

(65) Prior Publication Data

US 2021/0258211 A1    Aug. 19, 2021

Related U.S. Application Data

(63) Continuation of application No. 15/981,364, filed on May 16, 2018, now Pat. No. 11,018,930.

(51) Int. Cl.
*H04L 12/24* (2006.01)
*H04L 29/06* (2006.01)
*H04L 41/0806* (2022.01)
*H04L 9/40* (2022.01)

(52) U.S. Cl.
CPC .......... *H04L 41/0806* (2013.01); *H04L 63/02* (2013.01); *H04L 63/0823* (2013.01)

(58) Field of Classification Search
CPC .. H04L 41/0806; H04L 63/02; H04L 63/0823
See application file for complete search history.

(56) References Cited

U.S. PATENT DOCUMENTS

| | | | |
|---|---|---|---|
| 9,071,424 B1* | 6/2015 | Bowness | H04L 9/0838 |
| 9,626,543 B1* | 4/2017 | Ray | H04L 12/283 |
| 10,212,030 B2* | 2/2019 | Chakrabarti | H04L 41/0895 |
| 10,291,477 B1* | 5/2019 | Askar | H04W 4/50 |
| 10,484,237 B2* | 11/2019 | Papleux | H04L 67/04 |
| 2008/0112405 A1* | 5/2008 | Cholas | H04L 63/062 370/389 |
| 2010/0027469 A1* | 2/2010 | Gurajala | H04M 15/8038 370/328 |
| 2014/0126581 A1* | 5/2014 | Wang | H04W 4/50 370/431 |
| 2016/0337861 A1* | 11/2016 | Hawkes | H04L 63/166 |

(Continued)

*Primary Examiner* — Yonas A Bayou
(74) *Attorney, Agent, or Firm* — Thomas Horstemeyer, LLP

(57) ABSTRACT

Disclosed are various examples for gateway onboarding for IoT device management. In one embodiment, management service data is received. The management service data includes an enterprise identifier, and a management service address that specifies a network endpoint of the management service. A gateway is registered in association with the management service data based on receiving a registration request comprising: a gateway identifier, and the enterprise identifier. An activation request with the gateway identifier is received from the gateway, and the management service data is provided to the gateway.

20 Claims, 6 Drawing Sheets

(56) References Cited

U.S. PATENT DOCUMENTS

2017/0019853 A1\* 1/2017 Ghosh ............... H04W 52/0216
2017/0215023 A1\* 7/2017 Ly ....................... H04W 60/005
2017/0353859 A1\* 12/2017 Idnani ................... H04W 12/08
2019/0230063 A1\* 7/2019 McCready ............ H04L 63/101

\* cited by examiner

INTERNET OF THINGS GATEWAY ONBOARDING

CROSS-REFERENCE TO RELATED APPLICATIONS

This application is a continuation of, and claims priority to and the benefit of, U.S. application Ser. No. 15/981,364, filed on May 16, 2018 and entitled "INTERNET OF THINGS GATEWAY ONBOARDING," which is incorporated herein by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

Client devices, edge devices, and other devices can be required to authenticate with the management service to ensure secure management communications. However, onboarding gateways or other edge devices can be costly in time and effort in an enterprise environment that includes multiple gateways and edge devices. Onboarding gateways can require software updates to be manually applied, causing delays in time and lost efficiency in the onboarding process. It can be a security risk for technicians to have access to all or some of the information required for the gateway onboarding process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to Internet-of-Things (IoT) gateway onboarding with a management service. The gateway, when onboarded, can be managed by the management service and can be utilized for IoT device management. In order to provide data and interact with the physical world, IoT devices can connect to a network through a gateway or another edge device. Manual onboarding gateways or other edge devices through which IoT devices communicate can be complex, slow, and cause inefficiency in an enterprise environment. However, the present disclosure describes systems and methods that can improve the efficiency of gateway onboarding.

In some embodiments, onboarding a gateway can be achieved by activation of a gateway initiated by transmission of a request to activate the gateway to a network address of a gateway configuration service. The request to activate the gateway can include a gateway identifier that uniquely identifies the gateway. A gateway enrollment agent can be received from the gateway configuration service and installed. A management service address can also be received from the gateway configuration service. The gateway enrollment agent can enroll the gateway with a management service and replace the gateway enrollment agent with a gateway management agent. Enrollment of the gateway with the management service can be performed using the gateway enrollment agent. The enrollment can include transmission of a request to enroll the gateway to a management service address and installation of an enrollment policy received from the management service, for example, in response to the request. The gateway enrollment agent can be updated to a gateway management agent that can include an ability to install at least one IoT device management product.

In some examples, the network address can be associated with a configuration service. The network address, the gateway identifier, and a root certificate of the configuration service can be stored to the gateway using a bootstrap package. The gateway identifier can be retrieved from a data store of the gateway during activation using instructions installed using the bootstrap package. The request to activate the gateway can be authenticated based at least in part on the root certificate of the configuration service.

A root certificate of the management service can also be received. The request to enroll the gateway with the management service can be authenticated using the root certificate of the management service. Gateway credentials can also be received from the management service. The gateway credentials can be associated with a gateway account of the management service. The gateway credentials can authenticate the gateway with the management service.

Figure 1:
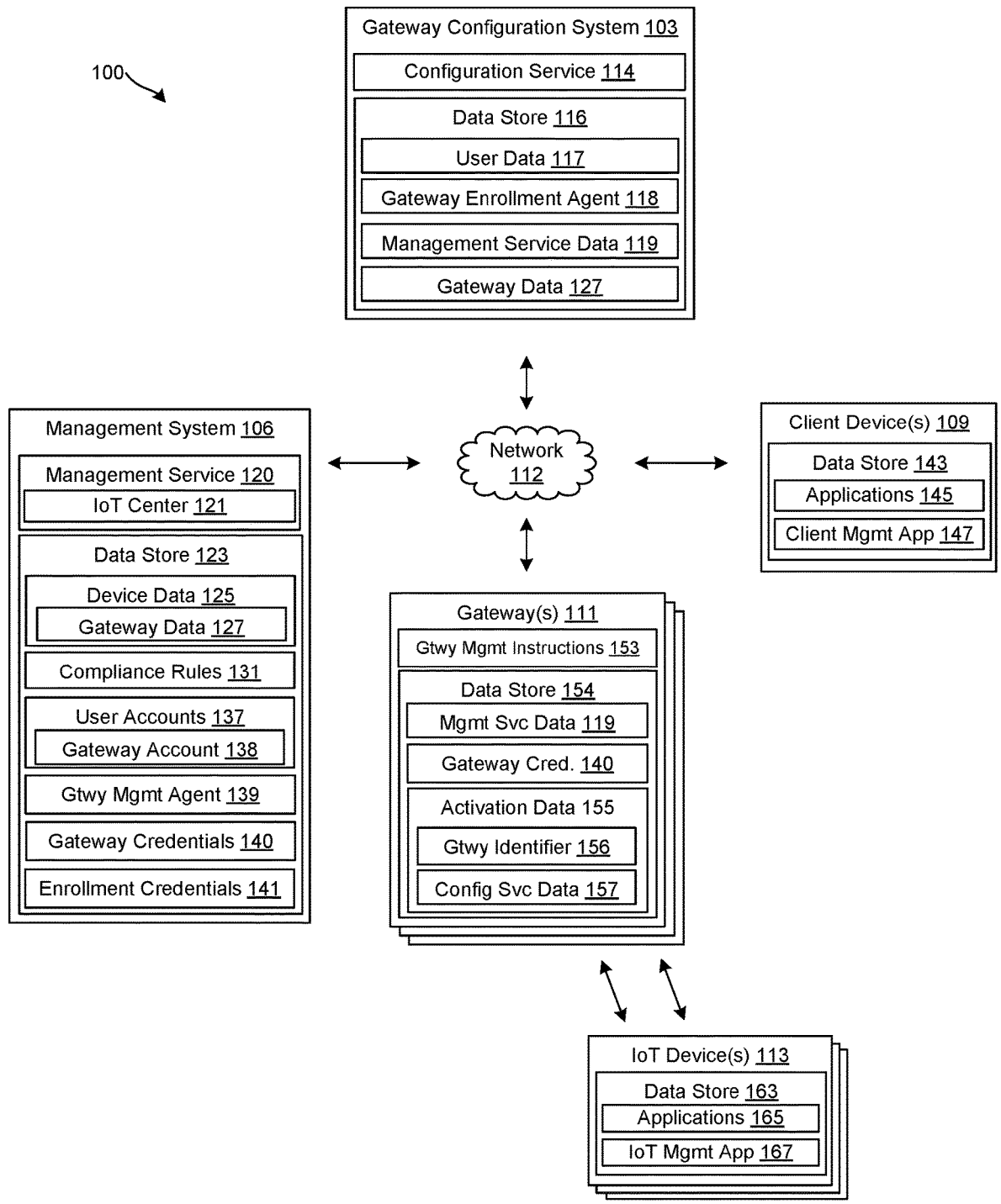
FIG. 1 is a drawing of an example of a networked environment that includes elements involved in onboarding a gateway.

With reference to FIG. 1, shown is an example of a networked environment 100. The networked environment 100 can include a gateway configuration system 103, a management system 106, a client device 109, a gateway 111, and other components in communication with one another over a network 112. Internet-of-Things (IoT) devices 113 and other devices can connect to the network 112 through the gateway 111. The components of the networked environment 100 can be utilized to enroll the gateway 111 with the management service 120 and securely obtain gateway credentials 140 and other information to communicate and authenticate with the management service 120. The gateway 111 can communicate with the management service 120 for management of the IoT devices 113 that connect to the network 112 through the gateway 111.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The gateway configuration system 103 can include a server computer or any other system providing computing capability. While referred to in the singular, the gateway configuration system 103 can include a plurality of computing devices that are arranged in one or more server banks, computer banks, or other arrangements. The gateway configuration system 103 can include a grid computing resource or any other distributed computing arrangement. The computing devices can be located in a single installation or can be distributed among many different geographical locations. The gateway configuration system 103 can also include or be operated as one or more virtualized computer instances. For purposes of convenience, the gateway configuration system 103 is referred to herein in the singular. Even though the gateway configuration system 103 is referred to in the singular, it is understood that a plurality of gateway configuration systems 103 can be employed in the various arrangements as described above.

The components executed on the gateway configuration system 103 can include a configuration service 114, as well as other applications, services, processes, systems, engines, or functionality not discussed in detail herein. The configuration service 114 can be stored in the data store 116 of the gateway configuration system 103. While referred to generally as the configuration service 114 herein, the various functionalities and operations discussed can be provided by the configuration service 114 or any of its components. The configuration service 114 can be considered a remote configuration service 114, and in some embodiments the gateway configuration system 103 can be remote from the other components. For example, the gateway configuration system 103 can be publicly deployed and can be accessible on the Internet through the network 112. In other embodiments, the gateway configuration system 103 can be local to at least one of the other components of the networked environment 100, and can be privately deployed in a local network associated with the enterprise and the management system 106. The data store 116 of the gateway configuration system 103 can include any storage device or medium that can contain, store, or maintain the instructions, logic, or applications described herein for use by or in connection with the instruction execution system. The data store 116 can be a hard drive or disk of a host, server computer or any other system providing storage capability. While referred to in the singular, the data store 116 can include a plurality of storage devices that are arranged in one or more hosts, server banks, computer banks, or other arrangements. The data store 116 can include any one of many physical media, such as magnetic, optical, or semiconductor media. More specific examples include solid-state drives or flash memory.

The data store 116 can include memory of the gateway configuration system 103, mass storage resources of the gateway configuration system 103, or any other storage resources on which data can be stored by gateway configuration system 103. The data stored in the data store 116 can be associated with the operation of the various applications and/or functional entities described. The data stored in the data store 116 can include, for example, user data 117, a gateway enrollment agent 118, management service data 119, as well as other data.

The configuration service 114 can generate a user interface or console accessible through a display of the gateway configuration system 103, or a display of a client device 109. For example, the client device 109 can access the user interface of the configuration service 114 through the network 112. In some cases, the configuration service 114 can provide a network site, web interface, or other user interface accessible through the network 112. The client device 109 can use the client management application 147, a browser application, or another application 145 to access the user interface of the configuration service. The user data 117 can include administrative user accounts as well as customer or enterprise accounts. Each enterprise account can be associated with a particular enterprise that has a management service 120. The user data 117 can also include a respective root certificates or other certificate mapped to each of the enterprise accounts. The certificates can be used to authenticate with the respective management service 120 of each enterprise.

An administrative user account can have access to the user interface or console of the configuration service 114 based on authentication using administrative credentials that can include one or more of a username, a password, a token, or a certificate. The user interface of the configuration service can generate a user interface element through which the administrative credentials can be entered or provided. In some cases, enterprise user accounts do not have access to the user interface or console of the configuration service 114.

The configuration service 114 can provide functionalities through the console user interface of the configuration service 114 and/or through application program interface (API) calls to APIs. API access can be provided through Hyper Text Transfer Protocol (HTTP) or Hyper Text Transfer Protocol Secure (HTTPS). Each functionality can also be associated with a particular URI and an HTTP command, method, or verb. For example, the configuration service 114 can provide a login and logout functionality associated with a POST method. The configuration service 114 can also include functionality to add a customer or customer identifier using a PUT method or a POST method. Functionality to obtain customer details can be provided using a GET method that returns the customer details including customer identifier, network address of a management service 120 of the customer, whether a management service certificate is stored, a list of gateways associated with the customer, and other details. Functionality to obtain a list of customers can be provided using a GET method. A customer can be deleted using a DELETE method. A customer certificate or management service 120 certificate associated with the customer can be updated using a PUT method or a POST method, and can be deleted using a DELETE method. A gateway 111 can be mapped to a customer using a PUT method, and can be unmapped using a DELETE method. A list of registered gateways 111 can be provided using a GET method. A gateway identifier can be obtained along with management service 120 information using a GET method. Each of these functionalities can also be access through the console or user interface of the configuration service 114.

The gateway enrollment agent 118 can be an agent, application, or other instructions executable by the gateway 111. The gateway enrollment agent 118 can facilitate enrollment of the gateway 111 with the management service 120. To this end, the gateway enrollment agent 118 can be configured to communicate with the management service 120, for example, through an enrollment endpoint of the management service 120 or an address associated with the management service 120. The gateway enrollment agent 118 can facilitate communications between the gateway 111 and the management service 120 and can implement actions on the gateway 111. The actions can be retrieved from a command queue of the management service 120. In some examples, gateway enrollment agent 118 is limited to performing enrollment and agent update actions and functionalities. The gateway enrollment agent 118 can be restricted from installing, or is unable to install products or applications for IoT device 113 management. In some cases, the management service 120 restricts the gateway enrollment agent 118 from installation of products or applications for IoT device 113 management.

Management Service data 119 can include information that can be used to communicate with the management service 120, and enroll a client device 109, gateway 111, or IoT device 113 with the management service 120. Management service data 119 can also include a network address, uniform resource locator (URL), uniform resource identifier (URI) or other information to facilitate communication with the management service 120. For example, an endpoint can be accessed by the gateway enrollment agent 118 through the URL or address of the management service 120.

The management service data 119 can also include authentication data to authenticate the gateway 111 with the management service 120. The authentication data can include a root certificate or another certificate that can be used to authenticate the gateway 111 with the management service 120. The management service certificate can be signed by a certificate authority associated with the management service 120. The certificate authority can be provided or self-signed by the management service 120, or can be a third party certificate authority utilized by the management service 120. The authentication data can also include an enrollment token such as a value, parameter, or file that can be used to authenticate the gateway 111 with the management service 120. An enrollment token can be included in a link for enrollment. In some cases, the management service 120 can distribute enrollment authentication data corresponding to each of the gateways 111. The configuration service 114 can provide the gateway enrollment agent 118 and management service data 119 to the gateway in response to a request. For example, the configuration service 114 can receive an activation request from the gateway 111. The request can also be a request for management service data 119 or a request for the gateway enrollment agent 118. The request can include a gateway identifier 156 that uniquely identifies the gateway 111. In some cases, the request can also include an enterprise identifier associated with an enterprise that operates the management service 120. The enterprise identifier can be associated with an enterprise account in the user data 117.

The configuration service 114 can provide a particular version of the gateway enrollment agent 118 based on the gateway identifier 156, a type of the gateway 111, or another parameter. The particular version of the gateway enrollment agent 118 can be a version that is executable on the gateway 111 or the type of the gateway 111. In some cases, the particular version of the gateway enrollment agent can be a version that includes the management service data 119, for example, authentication data, associated with the management service 120. Alternatively, the configuration service 114 can provide the gateway enrollment agent 118 separately from the management service data 119, and the gateway enrollment agent 118 can access and utilize the management service data 119 once installed on the gateway 111.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The management system 106 can be customer or enterprise-specific. In some embodiments, the management system can be part of a local network, and can be local to at least one of the other components of the networked environment, for example, as shown in FIG. 1. In other embodiments, the management system 106 can be remote from the other components, or the computing devices of the management system 106 can be located in a single installation or can be distributed among many different geographical locations local and/or remote from the other components. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120, an IoT Center 121, as well as other applications, services, processes, systems, engines, or functionality not discussed in detail herein. The IoT Center 121 can be considered a module, component, or process of the management service 120 and can be executed on the same computing device or can each be executed on a different computing device. The management service 120 and the IoT Center 121 can each be stored in the data store 123 of the management system 106. While referred to generally as the management service 120 herein, the various functionalities and operations discussed can be provided by the management service 120 or any of its components, including the management service 120 and the IoT Center 121.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 106, mass storage resources of the management system 106, or any other storage resources on which data can be stored by the management system 106. The data stored in the data store 123 can include, for example, management data including device data 125, enterprise data, compliance rules 131, and management service data 119, as well as other data.

The data stored in the data store 123 can be associated with the operation of the various applications and/or functional entities described. Client devices 109, gateways 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data 127 associated with gateways 111 and other edge systems or edge devices through which IoT devices 113 can connect to the network 112. The gateway data 127 can also include specifications, and for each gateway 111, a type of gateway or a gateway identifier 156, and other information. Specifications for the gateway 111 can include hardware configurations including a chipset utilized by the gateway, a performance or capacity, a model identifier, and software configurations, including an agent application installed on the gateway 111. For example, the configuration can identify an agent such as the gateway enrollment agent 118, the gateway management agent 139, or a version of the gateway enrollment agent 118 or the gateway management agent 139. The gateway data 127 can also include an organizational group.

Device data 125 can include data associated with a configuration of each client device 109, gateway 111, and IoT device 113, and can include an identifier of the client device 109, gateway 111, or IoT device 113. The identifier can be a serial number, media access control (MAC) address, other network address, or another device identifier. In addition, the device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data, while a client device 109, gateway 111, or IoT device 113 designated as "not enrolled," or having no designation, can be denied access to the enterprise data.

Additionally, device data 125 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 137, gateway accounts 138, or service accounts associated with each of the devices, the physical locations of each of the devices, the network to which each of the devices is connected, and other information describing the current state of each of the devices. While a user account 137 can be associated with a particular person, in some cases a user account 137 can be unassociated with any particular person, and can nevertheless be utilized for client devices 109, gateways 111, or IoT devices 113 that provide certain functionalities, such as automatic functionalities. For example, a gateway 111 can be associated with a service account or a gateway account 138 that is unassociated with any person.

Device data 125 can also include data pertaining to user groups. An administrator can specify one or more of the client devices 109, gateways 111, and IoT devices 113 as belonging to a user group. The user group can refer to a group of user accounts 137, which can include gateway accounts 138. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department. Device data 125 associated with a gateway account 138 can be referred to as gateway data 127.

Compliance rules 131 can include, for example, configurable criteria that must be satisfied for an enrolled one of the client devices 109, gateways 111, and IoT devices 113 to be in compliance with the management service 120. The compliance rules 131 can be based on a number of factors, including geographical location, activation status, enrollment status, and authentication data including authentication data obtained by a device registration system, time, and date, and network properties, among other factors associated with each device. The compliance rules can also be determined based on a user account 137 associated with a user. In some cases, a gateway 111 can be unassociated with a user, but can nevertheless be associated with a service account, a gateway account 138, or another user account 137 that is unassociated with a user.

Compliance rules 131 can include predefined constraints that must be met in order for the management service 120, or other applications, to permit access to the enterprise data or features of the gateway 111. The management service 120 can communicate with gateway management instructions 153 such as a gateway enrollment agent 118, gateway management agent 139, or other applications to determine whether states exist on the gateway 111 that do not satisfy one or more compliance rules 131. States can include, for example, a virus or malware being detected on the device; installation or execution of a blacklisted application; a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

The management service 120 can communicate with the gateway to determine whether states exist that do not satisfy one or more compliance rules 131 regarding the gateway 111 and IoT devices 113. The gateway management instructions 153 can receive IoT device 113 communications, for example from the IoT management application 167. The IoT device 113 communications can include status data for the IoT device 113. The gateway management instructions 153 can pass or otherwise transmit the status data to the management service 120 for evaluation of the compliance rules 131. The management service 120 can also transmit all or a portion of the compliance rules 131 to the gateway 111. The gateway 111 can store the compliance rules 131 in the data store 123. The gateway 111 can then determine or evaluate whether states exist, for example on the IoT devices 113, that do not satisfy one or more compliance rules 131, for example, without passing or transmitting the status data to the management service 120. In any case, determining that states exist in the IoT device 113 that do not satisfy one or more compliance rules 131 can trigger an action or command that causes the IoT device 113 to be in compliance with the compliance rules 131. In some examples, the compliance rules 131 include one or more commands that bring the IoT device 113 into compliance.

The gateway management agent 139 can be an agent, an application, or other instructions executable by the gateway 111. The gateway management agent 139 can facilitate communications between the gateway 111 and the management service 120 and can implement actions on the gateway 111. The actions can be retrieved from a command queue of the management service 120. To this end, the gateway management agent 139 can communicate with the management service 120, for example, through an enrollment endpoint of the management service 120 or an address associated with the management service 120. In some cases, the gateway management agent 139 is an updated or upgraded management agent that can perform at least one more action than the gateway enrollment agent 118. For example, the gateway enrollment agent 118 can be limited to installing the gateway management agent 139 and an enrollment policy, while the gateway management agent 139 is not limited to installing the gateway management agent 139 and an enrollment policy. The gateway management agent 139 can install at least one additional product or application other than the gateway management agent 139 and can install at least one policy other than the enrollment policy. In some cases, the gateway management agent 139 can be permitted to obtain gateway credentials 140, and the gateway enrollment agent 118 can be restricted from obtaining the gateway credentials 140.

Gateway credentials 140 can be credentials associated with the gateway account 138 and can enable or permit communications with the IoT Center 121 of the management service 120. The gateway credentials 140 are provided to the gateway 111 for authentication with the management service 120 and the IoT Center 121 for management and IoT operations. In some situations, the gateway credentials 140 are not provided to or exposed to any user during the enrollment process. The gateway credentials 140 can include one or more of a username, a password, an enrollment token, a management service root certificate, or another management service certificate, for authentication with the management service 120. In some examples, the gateway credentials 140 can include a hash message authentication code (HMAC) token.

The management service 120 can oversee the management of devices including the client devices 109 and gateways 111. The management service 120 can oversee the operation of the devices enrolled with the management service 120 as well as manage enrollment and un-enrollment operations for the devices, for example, using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of the gateways 111 associated with the enterprise, as well as devices that connect to the network 112 through the gateways 111, including IoT devices 113. An enterprise can be any customer of the management service 120. The management service 120 can remotely configure the client device 109 by interacting with an agent application, a gateway management instructions 153 or another application 145 executed on the client device 109. Likewise, the management service 120 can remotely configure the gateway 111 by interacting with an agent application, gateway management instructions 153, or another application executed on the gateway 111. The gateway management instructions 153 can include a number of components including an IoT Agent for management and communication with IoT devices 113.

The management service 120 can transmit various software components to the gateway 111 which are then installed, configured, or implemented by the gateway management instructions 153. Such software components can include, for example, additional client applications, resources, libraries, drivers, device configurations, or other similar components that require installation on the gateway 111 as specified by the enterprise or an administrator of the management service 120. The management service 120 can further cause policies to be implemented on a gateway 111. Policies can include, for example, restrictions or permissions pertaining to capabilities of a gateway 111. For instance, policies can require certain hardware or software functions of the gateway 111 to be enabled or be disabled during a certain time period or based on a particular location. Such policies can be implemented by the gateway management instructions 153. The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management instructions 153.

Likewise, the management service 120 can transmit various software components to the client device 109 which are then installed, configured, or implemented by the client management application 147. Such software components can include, for example, additional applications 145, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by client management application 147.

The management service 120 can also transmit various software components to the IoT device 113 which are then installed, configured, or implemented by the IoT management application 167. Such software components can include, for example, additional applications 195, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location. Such policies can be implemented by the IoT management application 167. The management service 120 can transmit the software components to the IoT device 113 through the gateway 111. The management service 120 can have a command queue storing at least one action to perform on the particular gateway 111 upon check-in of the gateway 111. For instance, the gateway management instructions 153 can cause the gateway 111 to check-in with the management service 120, identify an action in the command queue, and perform or implement the action. An action can be the installation of a profile, or the execution of a command or other actions to install software components, implement policies, update the gateway management instructions 153, install a software product, or implement other commands. In some cases, the gateway management instructions 153 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113. In one example, the contents of the command queue can include a command that the gateway management instructions 153 cause to be executed on the gateway 111. In another example, the contents of the command queue can include a resource, an application, or an application update that the gateway management instructions 153 cause to be installed on the gateway 111, which the gateway can access through a specified uniform resource locator (URL) in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management instructions 153 can cause the gateway 111 to check-in with the management service 120. The gateway management instructions 153 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The management service 120 can oversee the enrollment of gateway 111 with the management service 120. In some instances, the management service 120 can include a web application that can be accessed by the client device 109 through the network 112 to perform functionality related to secure enrollment of gateway 111 and secure delivery of credentials to the gateway 111. The management service 120 instructions can also store other functionality in a data store 123 of the management system 106. The data store 123 can include memory of the management system 106, mass storage resources of the management system 106, or any other storage resources on which data can be stored by the management system 106.

The management service 120 can provide operations associated with enrollment of the gateway 111 with the management service 120. For example, the management service 120 can provide an endpoint such as an API, network site, or network location for enrollment of the gateway 111 with the management service 120. The management service 120 can receive a request to enroll the gateway 111 that includes a gateway identifier 156. The request can also include an enterprise identifier that uniquely identifies an enterprise or a customer. The management service 120 can then perform enrollment operations. In the various examples, the enrollment operations can include one or more of creating a gateway account 138 associated with the gateway 111, generating gateway credentials 140 for authentication of the gateway 111 with the management service 120 for IoT device 113 management, associating the gateway credentials 140 with multiple accounts and functionalities of the management service 120, setting or changing ACL rules associated with the gateway account 138, and securely transmitting the gateway credentials 140 to the gateway 111.

The IoT Center 121 can oversee management of gateways 111, routers, routing switches, integrated access devices (IADs), multiplexers, a variety of metropolitan area network (MAN) and wide area network (WAN) access devices, and other edge devices. The IoT Center 121 can also oversee management of IoT devices 113 that are connected through the edge devices. The IoT Center 121 can generate and provide an administrative console or user interface for management of the gateway 111, other edge devices, and IoT devices 113 that are connected through the edge devices. The user interface of the IoT Center 121 can be accessed through client management application 147 or another application of a client device 109, or can be accessed through a network site provided by the IoT Center 121 or the management service 120. The IoT Center 121 can provide a user interface for setting and viewing alerts and notifications. The alerts and notifications can also be sent to a particular email address or to a particular client device 109.

The IoT Center 121 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The IoT Center 121 can also include an analytics service that provides real-time infrastructure analytics for the gateway 111, other edge devices, and IoT devices 113. The analytics can be generated based on IoT metrics data provided from the gateway 111 or other edge devices. The gateway 111 can provide IoT metrics data based on IoT device 113 communications with the gateway 111. The IoT Center 121 can also provide or utilize the command queue and notification services as discussed above regarding the management service 120, for instance, to in order to provide over-the-air software and policy updates for the gateway 111, other edge devices, and IoT devices 113.

The IoT metrics data can include a stream of at least one tuple including a number and a time stamp. The IoT metrics data can include a sampling function which is a user defined method (udm), a sampling frequency stating the interval between subsequent executions of the udm, and an aggregation count stating how many executions of the udm to aggregate before sending the IoT metrics data, for example, to the management service 120 or IoT Center 121. The IoT metrics data can include SI units and a prefix that identifies what the numbers of the stream of IoT metrics data represent. A user interface can be generated based at least in part on the IoT metrics data.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 143 that also includes applications 145, a client management application 147, and other data. The client device 109 can execute the client management application 147 to perform or access the functionality described for the management system 106, including the management service 120, the management service 120, and the IoT Center 121.

In one example, the client device 109 can be or include the gateway 111 itself. For instance, the client device 109 can include the gateway 111 and a display device coupled to the gateway 111 through which user interfaces rendered by the gateway 111 can be viewed and utilized by a user. In such case, the client management application 147 can be or include the gateway management instructions 153. In another example, the client device 109 can be a different computing device from the gateway 111 and can be used to instruct the gateway 111 to perform certain functionality. In this case, the client management application 147 can be a different application than the gateway management instructions 153, and the client management application 147 can cause the gateway management instructions 153 to perform certain functionality by transmitting appropriate instructions over the network 112. Further, in such case, the client management application 147 can be a native application, or the client management application 147 can be a browser application configured to provide access to a web-based service which can be hosted or made accessible by the gateway management instructions 153.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 165, such as a client management application 147, a browser application, or another application. The operating system and some applications 145 can access network content served up by the management system 106, or other servers, thereby rendering a user interface on a display, such as a liquid crystal display (LCD), organic light emitting diode (OLED) display, touch-screen display, or other type of display device.

To this end, some applications 145 can include a browser or a dedicated application, and a user interface can include a network page, an application screen, or other interface. The client device 109 can also access web applications using the browser application. Further, other applications 145 can include device management applications, enterprise applications, social networking applications, word processors, spreadsheet applications, media player applications, or other applications. The client management application 147 can be an application that performs certain functions in the enrollment of the gateway 111 with the management service 120. The client management application 147 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute gateway management instructions 153 and other applications and modules stored in the data store 154. The gateway management instructions 153 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111.

For example, the gateway management instructions 153 can initially be installed by a bootstrap package including initial gateway management instructions 153. The bootstrap package or gateway management instructions 153 can cause the gateway 111 to store activation data 155 that can be used for activation requests. The bootstrap package can be pre-packaged or preinstalled at manufacture. Activation data 155 can include a serial number or other gateway identifier 156 that uniquely identifies the gateway 111. The activation data 155 can also include configuration service data 157. Configuration service data 157 can include a URL or other address for the configuration service 114 and a root certificate or another certificate for the configuration service 114. The configuration service certificate can be signed by a certificate authority associated with the configuration service 114. The certificate authority can be provided or self-signed by the configuration service 114, or can be a third party certificate authority utilized by the configuration service 114. The bootstrap package can also cause the gateway management instructions 153 to include a software development kit (SDK) or other instructions to retrieve the gateway identifier from the data store 154 and/or a configuration loader to communicate with the configuration service 114. The bootstrap package can also cause the gateway management instructions 153 to include a gateway certificate signed by the gateway manufacturer certificate authority. A DHCP loader can also be included to communicate with DHCP services associated with a local network portion of the network 112. A Domain Name System (DNS) loader can also be included to communicate with network locations that are indicated using a domain name, which can be converted into Internet Protocol (IP) addresses. A service auto-discovery module such as Avahi can also be included. The service auto-discovery module can enable automatic discovery of services and hosts in a local network portion of the network 112.

In some examples, a management agent such as the gateway enrollment agent 118 or the gateway management agent 139 can also be included or preinstalled by the bootstrap package. The gateway management instructions 153 or a module or portion of the gateway management instructions 153 can be received from the other components of the networked environment and installed to update the gateway management instructions 153. In some situations, the activation data 155 can also include an enterprise identifier. The enterprise identifier can be associated with an enterprise account with the configuration service 114.

The gateway management instructions 153 can include an IoT agent for management and communication with IoT devices 113. The gateway management instructions 153 can perform the functionality described for the management system 106, including the management service 120, the management service 120, and the IoT Center 121, for instance, by checking in, retrieving a command from the command queue, and implementing the command as discussed above. The gateway 111 can provide network 112 access to the IoT devices 113, as well as implement enrollment processes and gathering IoT metrics data based on IoT device 113 communications with the gateway 111.

The data store 154 can also include management service data 119, and the gateway management instructions 153 can communicate and authenticate with the management service 120 using the management service data 119. The data store can also include gateway credentials 140 that are received from the management service 120. In some cases, the gateway credentials 140 are not accessible, shown, or displayed by the gateway management instructions 153. In some examples, the user is not provided access to the gateway credentials 140, and the gateway credentials 140 are stored or known only by the management service 120 and the gateway 111 through the gateway management instructions 153. The authentication data can also include a root certificate of the management service 120.

An administrator, technician, or other user can be provided with enrollment credentials 141 that are limited to onboarding operations including obtaining the gateway management instructions 153 and the gateway credentials 140. The user can manually enter the enrollment credentials 141 through a console interface of the gateway 111 during an onboarding process. The management service 120 can generate and provide gateway credentials 154 to authenticate the gateway 111 with the management service 120. Management service 120 can also provide gateway management instructions 153 to the gateway 111. The gateway credentials 154 are obscured from users, and not provided to or rendered on a display for viewing by users. In some situations, the gateway credentials 154 are known only by the management service 120 and the gateway 111. In this way, the gateway 111 can be enrolled with the management service 120 without a user being exposed to the gateway credentials 154. The IoT devices 113 can be enrolled with the management service 120.

Enrollment credentials 141 can be generated by the management service 120, for example, by the IoT center 121. The enrollment credentials 141 can then be provided to an administrator, technician, or another user for gateway onboarding and enrollment operations. In one example, the management service 120 can transmit the enrollment credentials 141 to a particular user using one or more electronic methods including: SMS, MIMS, email, instant messenger application, or message board application. In another example, the management service 120 can provide a particular user with access to the enrollment credentials 141 by causing a physical shipment including a physical copy of the enrollment credentials 141 to be delivered to a physical address associated with the particular user. Alternatively or additionally, enrollment credentials 141 can be limited by only enabling the enrollment credentials 141 to authenticate with an enrollment endpoint or an onboarding endpoint of the management service 120.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications. The operating system can be stored in a data store 163 that also includes applications 165, an IoT management application 167, and other data. The IoT device 113 can execute the IoT management application 167 to perform or access the functionality described for the management system 106, including the management service 120, the management service 120, and the IoT Center 121.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management application 167 can perform actions as directed by the management service 120 and/or the gateway 111. The gateway management instructions 153 and/or the management service 120 can maintain a command queue for the IoT device 113. The command queue for the IoT device 113 can include actions and commands as discussed. The gateway management instructions 153 can determine whether states exist on the IoT device 113 that violate one or more of the compliance rules 131 based on status data received from the IoT device 113, or pass status data received from the IoT device 113 to the management service 120 to perform the evaluation. If the IoT device 113 is not in compliance, the gateway management instructions 153 or the management service 120 can place a command to bring the IoT device 113 into compliance in a command queue for the IoT device 113. The IoT management application 167 can retrieve the command to bring the IoT device 113 into compliance. The IoT management application 167 can implement the command. The management service 120 can place a command for the IoT device 113 in the command queue for the gateway 111. The gateway management instructions 153 can retrieve the command and place it in a command queue for the IoT device 113 that is maintained on the gateway 111.

A Dynamic Host Configuration Protocol (DHCP) Server can be provided as part of a local network of the network 112. An administrator can post a local IP address, URL, network address, or endpoint associated with the gateway configuration service 114 to the DHCP server. For example, DHCP parameters code 6, or a DNS server code of the DHCP server can be associated with the local IP address, URL, network address, or endpoint associated with the gateway configuration service 114. The gateway management instructions 153 of the gateway 111 can retrieve this information from the DHCP server, contact the gateway configuration service 114, and proceed with the gateway enrollment process. The gateway management instructions 153, for example, a DHCP loader, can obtain the gateway enrollment agent 118 and/or management service data 119 from the local gateway configuration system 103. The DHCP server and local gateway configuration system 103 can be utilized by customers or enterprises that do not desire management service data 119 aggregated on a remote gateway configuration system 103 that the customer or enterprise does not control.

Figure 2:
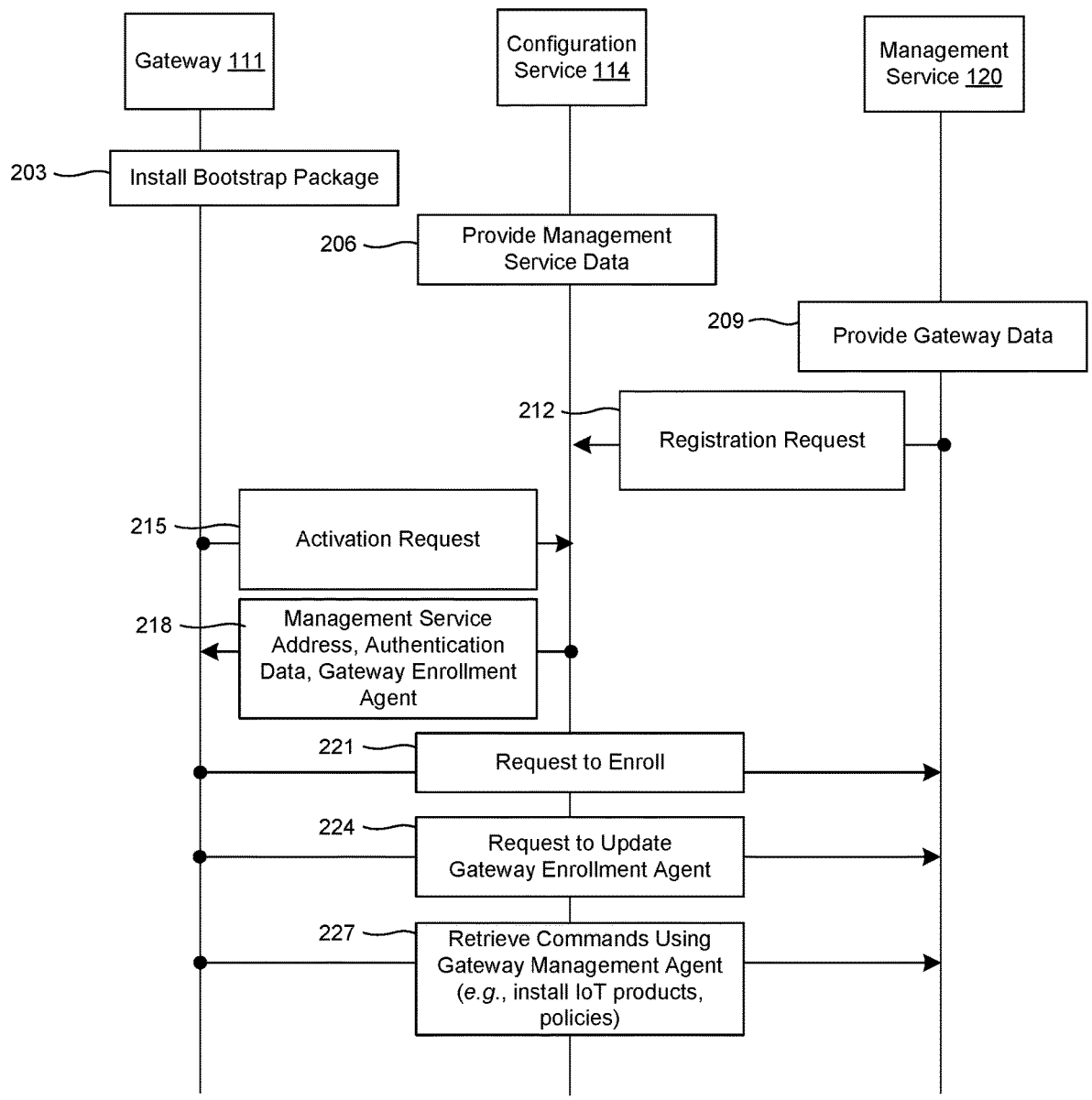
FIG. 2 is a sequence diagram illustrating functionality implemented by components of the networked environment.

FIG. 2 shows a sequence diagram that illustrates steps performed by components of the networked environment 100. Generally, this sequence enables the gateway 111 to enroll with the management service 120. For example, the gateway 111 can securely obtain gateway credentials 140 to authenticate with the management service 120, an address of the management service 120, a root certificate of the management service 120, and other information to communicate and authenticate with the management service 120. The gateway 111 can communicate with the management service 120 for management of the gateway 111 and IoT devices 113 that connect to the network 112 through the gateway 111.

In step 203, a bootstrap package can be installed on the gateway 111. The bootstrap package can be installed by the manufacturer of the gateway 111 or can otherwise be installed to a batch or set of gateways 111 associated with a particular customer or enterprise. Installing the bootstrap package can cause the gateway 111 to store activation data 155 for the gateway 111. Activation data 155 can include a serial number or other gateway identifier 156. Activation data 155 can also include configuration service data 157 can be stored in the data store 154. Configuration service data 157 can include a URL or other address for the configuration service 114 and a root certificate or another certificate for the configuration service 114. Installing the bootstrap package can also cause the gateway management instructions 153 to include a software development kit (SDK) or other instructions to retrieve the gateway identifier from the data store 154 and a configuration loader to communicate with the configuration service 114. A DHCP loader can also be included to communicate with the DHCP server of a local network. In some examples, a management agent such as the gateway enrollment agent 118 or the gateway management agent 139 can also be included or installed by the bootstrap package.

In step 206, the configuration service 114 can obtain the management service data 119. The management service data 119 can be provided to the configuration service 114 in a number of ways. For example, the configuration service 114 can generate a user interface through which a configuration administrator enters the management service data 119. The configuration service 114 can also include an API or API call to obtain the management service data 119. The configuration service 114 can receive a request to enter management service data 119. The request can include the management service data 119.

Management Service data 119 that is provided to the configuration service can include a network address, uniform resource locator (URL) or other information to facilitate communication with the management service 120. For example, an endpoint can be accessed by the gateway enrollment agent 118 through the URL or address of the management service 120, which can include an endpoint of the IoT Center 121. In some examples, the management service data 119 can include a customer identifier and a customer-specific URL, for example, a tuple <Customer Identifier, Customer IoT Center URL>. The customer identifier can be associated with the management service 120, which can be a customer-specific or enterprise-specific management service 120 that is operated by the customer or enterprise. The management service data 119 can also include authentication data to authenticate the gateway 111 with the management service 120. For example, the configuration administrator can post a root certificate to the configuration service 114. The root certificate can be used to authenticate the gateway 111 with the management service 120. The authentication data can also include an enrollment token such as a value, parameter, or file that can be used to authenticate the gateway 111 with the management service 120. In some cases, the management service data 119 can be incorporated into a version of the gateway enrollment agent 118 that is provided to the configuration service 114. In other cases, the management service data 119 can be provided separately from the gateway enrollment agent 118.

In step 209, the management service 120 can obtain gateway data 127. The gateway data 127 can include gateway identifier 156 that uniquely identifies the gateway 111. For example, the gateway identifier 156 can be a manufacturer-assigned serial number. The gateway data 127 can also include an organizational group associated with the gateway 111. The gateway data 127 can be associated with a gateway account 138 within the management service 120. For example, the management service 120 can generate a user interface through which an enterprise administrator or technician enters the gateway data 127. The management service 120 can also include an API or API call to obtain the management service data 119. The configuration service 114 can receive a request to enter the gateway data 127. The request can include the gateway data 127.

In step 212, the management service 120 can transmit a request to register the gateway 111 with the configuration service 114. The request to register the gateway 111 can include registration data. Registration data can include the gateway data 127, including a gateway identifier 156. The registration data can also include management service data 119 such as a management service identifier, a customer identifier, or another enterprise identifier. The request to register the gateway 111 can include an enterprise identifier and a gateway identifier 156 for example, a tuple <Enterprise Identifier, Gateway Identifier>. The configuration service 114 can include a network endpoint or an API that receives the request to register from the management service 120. The configuration service 114 can determine that the request is transmitted from a management service 120. In some examples, the request can include data that identifies the management service 120. In other situations, the configuration service 114 can identify that the request is transmitted from a management service 120 based on a particular API or network endpoint utilized by the configuration service 114 to receive registration data from management services 120. The registration data for the gateway 111 can be stored in the data store 116.

The configuration service 114 can compare the registration request with the management service data 119 already stored in the data store 116. The configuration service 114 can store the gateway identifier 156 in association with the network address, uniform resource locator (URL) or other communication information of the management service data 119 if a customer identifier, enterprise identifier, or management service identifier is present in both the registration request and the management service data 119.

In step 215, the gateway 111 can transmit a request to activate the gateway 111 to the configuration service 114. The request can also be considered a request for a gateway enrollment agent 118, for example, when the gateway enrollment agent 118 is not preinstalled using the bootstrap package. The gateway 111 can establish a secure connection and authenticate the configuration service 114 using the root certificate or other certificate of the configuration service 114. In addition, the configuration service 114 can authenticate the gateway 111 using a root gateway certificate or other gateway certificate for the gateway 111. The gateway certificate can be self-signed by the manufacturer of the gateway 111 or signed by a certificate authority associated with the manufacturer of the gateway 111. To this end, the gateway 111 and the configuration service 114 can transmit and exchange respective certificates for validation. The request to activate the gateway 111 can include activation data 155. Activation data 155 can include a gateway identifier 156. The gateway management instructions 153 can retrieve the gateway identifier 156 from the data store 154 of the gateway 111. The gateway management instructions 153 can transmit activation data 155 to configuration service 114 in the request to activate the gateway 111. In some situations, the activation data 155 can also include an enterprise identifier, or include a tuple <Enterprise Identifier, Gateway Identifier>.

The configuration service 114 can include a network endpoint or an API that receives activation requests from the gateway management instructions 153. The configuration service 114 can determine that the request is transmitted from a gateway 111. For example, the request can include data that identifies the gateway 111 as the provider of the activation data 155. Alternatively, the configuration service 114 can identify that the request is transmitted from a gateway 111 based on a particular API or network endpoint utilized by the configuration service 114 to receive activation data 155 from gateways 111.

In step 218, the configuration service 114 can transmit management service data 119 to the gateway 111. The management service data 119 can include a network address, URL, or other communication information for the management service 120. Authentication data for the management service 120 can also be transmitted to the gateway 111. The authentication data can include a root certificate or another certificate associated with the management service 120. In some cases, a gateway enrollment agent 118 can also be transmitted to the gateway 111. The configuration service 114 can transmit a particular version of the gateway enrollment agent 118 that includes the management service data 119 and the authentication data for the management service 120. Alternatively, the gateway enrollment agent 118 can be transmitted separately from the management service data 119. In some examples, the bootstrap package installed on the gateway 111 includes the gateway enrollment agent 118 and it is not transmitted using the configuration service 114. The configuration service 114 can compare the activation data 155 received in the activation request with the registration data received in the registration request. The configuration service 114 can identify management service data 119 based on the comparison. The activation data 155 can include a gateway identifier 156. The configuration service 114 can identify registration data that also includes the gateway identifier 156 and can identify management service data 119 that is associated with the gateway identifier 156. In some examples, the configuration service 114 can also identify a gateway enrollment agent 118 that is associated with the gateway identifier 156.

In step 221, the gateway enrollment agent 118 can transmit a request to enroll the gateway 111 with the management service 120. The request to enroll the gateway 111 can include the gateway identifier 156, an organizational group, and other information. The gateway enrollment agent 118 can be configured to communicate with the management service 120, for example, through an enrollment endpoint of the management service 120 or an address associated with the management service 120. The gateway enrollment agent 118 can establish a secure connection with the management service 120 using the root certificate or other certificate of the management service 120. In some examples, gateway enrollment agent 118 is limited to actions that enroll the gateway with the management service and replace the gateway enrollment agent 118 with a gateway management agent 139. The gateway enrollment agent 118 can receive an enrollment policy from the management service 120 and install the enrollment policy on the gateway 111.

In step 224, the gateway enrollment agent 118 can transmit a request to update the gateway enrollment agent 118 to the management service 120. The management service 120 can transmit a command to install the gateway management agent 139 in response to the request. The command to install the gateway management agent 139 can include a network address or URL to obtain or download the gateway management agent 139. The gateway enrollment agent 118 can implement the command by downloading and installing the gateway management agent 139 to update and replace the gateway enrollment agent 118. In some situations, the gateway enrollment agent 118 can be limited to installing the gateway management agent 139 and installing an enrollment policy. In some cases, gateway credentials 140 associated with the gateway account 138 with the management service 120 are also provided and stored on the gateway 111 by the gateway enrollment agent 118. The gateway credentials 140 can identify the gateway 111 for authentication and communication with the management service 120, for example, upon the gateway management agent 139 checking in or transmitting a request to the management service 120. In some cases, the gateway management agent 139 can be permitted to use the gateway credentials 140 for authentication and communication with the management service 120. The gateway enrollment agent 118 can be restricted from using the gateway credentials 140 for authentication and communication with the management service 120.

In step 227, the gateway management agent 139 can retrieve commands from the management service 120. In some cases, the gateway enrollment agent 118 is limited to enrollment and update actions, while the gateway management agent 139 can install at least one additional product or application other than or in addition to the gateway management agent 139, and can install at least one policy other than or in addition to the enrollment policy. For example, the gateway management agent 139 can include an ability to install products or policies associated with IoT device 113 management, or is permitted to install products or policies associated with IoT device 113 management by the management service 120. The gateway enrollment agent 118 can be unable to install products or policies associated with IoT device 113 management, or can be restricted from installing the products or policies associated with IoT device 113 management by the management service 120.

Figure 3:
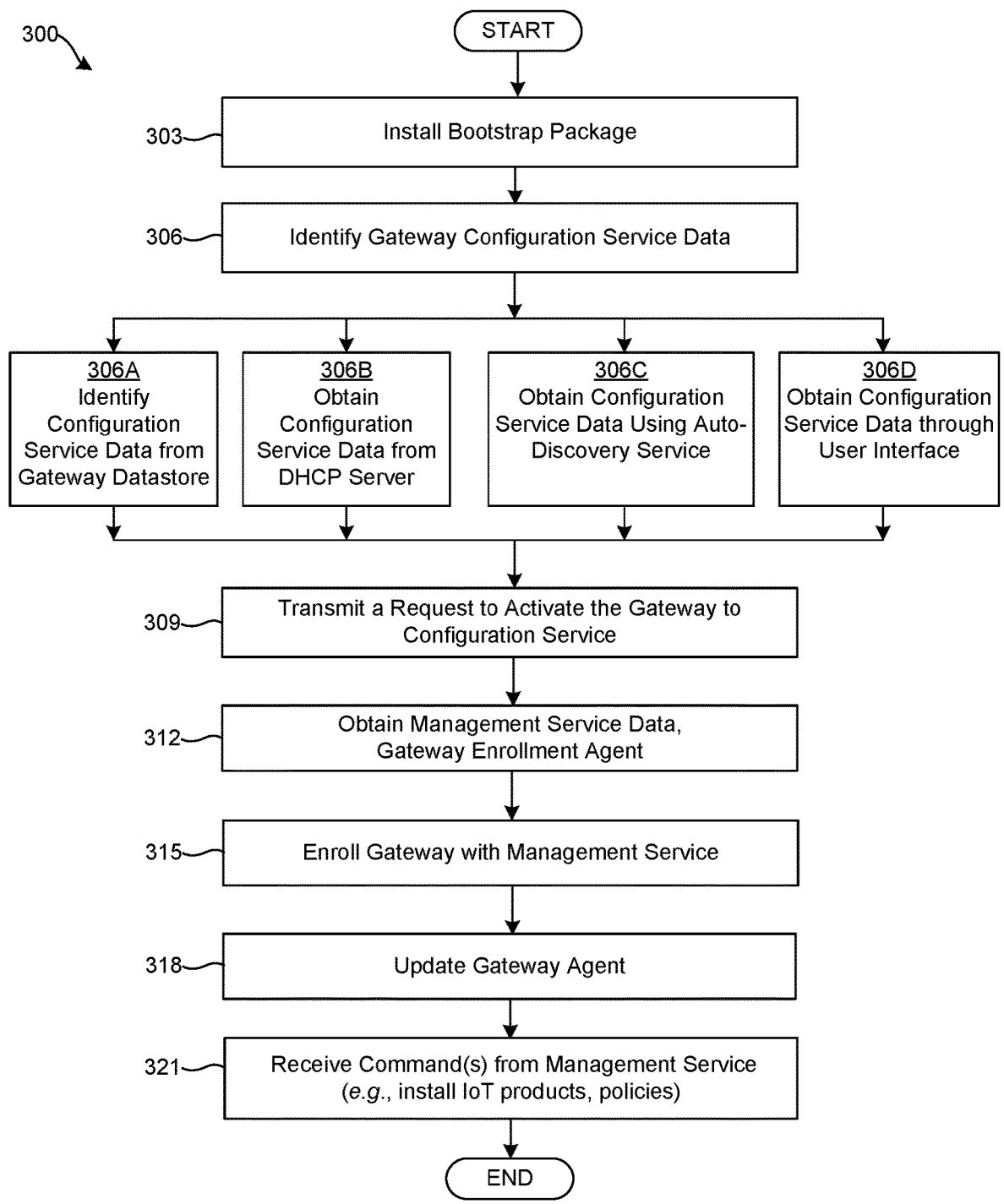
FIGS. 3-5 are flowcharts illustrating functionality implemented by components of the networked environment.

FIG. 3 shows a flowchart 300 that illustrates an example of the operation of the gateway 111. Flowchart 300 illustrates an example of onboarding of the gateway 111 with the management service 120 for IoT device management. The onboarding can include enrollment of the gateway 111 with the management service 120 and installation of gateway management agent 139. Onboarding can also include securely providing the gateway 111 with gateway credentials 140 to authenticate the gateway 111 with the management service 120 for IoT device 113 management operations.

In step 303, a bootstrap package or other installation package is installed on the gateway 111. The bootstrap package can be installed by the manufacturer of the gateway 111 or can otherwise be installed to a batch or set of gateways 111 associated with a particular customer or enterprise. Installing the bootstrap package can cause the gateway 111 to store activation data 155 for the gateway 111. Activation data 155 can include a serial number or other gateway identifier 156. Activation data 155 can also include configuration service data 157 that can be stored in the data store 154. Configuration service data 157 can include a URL or other address for the configuration service 114 and a configuration service certificate such as a root certificate or another certificate for the configuration service 114.

Installing the bootstrap package can also cause gateway management instructions 153 to be installed. The gateway management instructions can include a software development kit (SDK) or other instructions to retrieve the gateway identifier from the data store 154 and a configuration loader to communicate with the configuration service 114. A DHCP loader can also be included to communicate with the DHCP server of a local network. In some examples, a management agent such as the gateway enrollment agent 118 or the gateway management agent 139 can also be included or installed by the bootstrap package.

In some cases, the gateway management instructions 153 can generate a user interface. The gateway management instructions 153 can generate the user interface for access through a display of the gateway 111, or can generate the user interface for access over the network 112 using a client device 109. The user interface can include a user interface element through which enrollment credentials 141 can be entered by a technician or other user. The enrollment credentials 141 can be entered to initiate the process, or can be entered at any point in the process prior to contacting the management service 120. The enrollment credentials 141 can be used to establish trust or authenticate with the management service 120. Using enrollment credentials 141 for initial gateway enrollment communications with the management service 120 can prevent unauthorized access to the management service 120 by stolen gateways 111 or otherwise unauthorized gateways 111 that have access to the configuration service data 157 or gateway management instructions 153. Accordingly, proprietary software including the gateway management agent 139 and other applications and products provided by the management service 120 to the gateway 111 are not at risk for unauthorized access.

In step 305, the gateway management instructions 153 can determine whether to use the configuration service 114. The gateway management instructions 153 can include activation instructions for the gateway 111 to perform upon startup or powering on of the gateway 111. The activation instructions can specify whether the configuration service 114 is to be used or whether the DHCP server is to be used. If the activation instructions specify that the configuration service 114 is to be used for gateway activation, then the process moves to step 306. If the activation instructions specify that the DHCP service is to be used for gateway activation, then the process moves to step 315.

In step 306, the gateway management instructions 153 can identify configuration service data 157. Configuration service data 157 can include a URL or other address for the configuration service 114. Configuration service data 157 can also include a root certificate or another certificate for the configuration service 114. The gateway management instructions 153 can include a particular process or multiple processes for obtaining or identifying the configuration service data 157. The gateway management instructions 153 can determine which process to use based on factors including whether the gateway 111 is connected to a network, or whether the gateway 111 has internet access. The gateway management instructions 153 can also assign a priority to each process to identify the configuration service data 157, or a particular sequence in which to try each process.

For example, in step 306A, the gateway management instructions 153 can retrieve the configuration service data 157 from the data store 154 of the gateway 111. The bootstrap package can install configuration service data 157 that includes a static URL, static domain name, or a fully qualified domain name (FQDN) that identifies a host and a domain name for the configuration service 114. In some cases, the gateway 111 can access the Internet, and can communicate with the configuration service 114 using the static URL, domain name, or FQDN over the Internet. In other cases, the gateway 111 cannot access the Internet. The gateway 111 can be connected to a local network or a section of the network 112 that is isolated from the Internet, and the configuration service 114 is hosted on the local network. In these cases, a local DNS server can include an entry that maps the static domain name or FQDN to a static IP address or local IP address where the configuration service 114 is hosted. The gateway management instructions 153 can transmit the FQDN to the DNS server, and retrieve the local IP address. The gateway management instructions 153 can communicate with the configuration service 114 using the local IP address.

The bootstrap package can install configuration service data 157 that includes a predetermined static IP address associated with the gateway configuration service 114. In some situations the gateway 111 can be connected to a local network or a section of the network 112 that is isolated from the Internet, and the configuration service 114 is hosted on the local network. The gateway management instructions 153 can communicate with the configuration service 114 using the predetermined static IP address, which can be a local IP address.

The bootstrap package can install configuration service data 157 that includes multiple public URLs, IP addresses, network addresses, or endpoints associated with the gateway configuration service 114. When deployed the gateway management instructions 153 can attempt to connect to one of the public endpoints. If the attempt is unsuccessful, the gateway management instructions 153 can try another one of the endpoints.

In step 306B, the gateway management instructions 153 can obtain configuration service data 157 from a DHCP server. The gateway 111 can be connected to a local network or a section of the network 112 that is isolated from the Internet. The local DHCP server can include a local IP address, URL, network address, or endpoint associated with the gateway configuration service 114 that is mapped to DHCP parameters code 6, or a DNS server code of the DHCP server. The gateway management instructions 153 can request a DNS server address from the DHCP server and receive the local IP address, URL, network address, or endpoint associated with the gateway configuration service 114.

In step 306C, the gateway management instructions 153 can obtain configuration service data 157 using an auto-discovery service. The gateway management instructions 153 can transmit, multicast, or broadcast User Datagram Protocol (UDP) packets to identify entities that provide services. The configuration service 114 can reply to the UDP packet with a IP address, URL, network address, or endpoint associated with the gateway configuration service 114.

In step 306D, gateway management instructions 153 can obtain configuration service data 157 through a user interface. The gateway management instructions 153 can generate a user interface element through which an IP address, URL, network address, or endpoint associated with the gateway configuration service 114 can be entered by a technician or user that is activating the gateway 111. The gateway management instructions 153 can generate the user interface for access through a display of the gateway 111, or can generate the user interface for access over the network 112 using a client device 109.

In step 309, the gateway management instructions 153 can transmit a request to activate the gateway 111 to the configuration service 114. The request can also be considered a request for a gateway enrollment agent 118, for example, when the gateway enrollment agent 118 is not preinstalled using the bootstrap package. The request to activate the gateway can include the gateway identifier 156. The gateway management instructions 153 can retrieve the gateway identifier 156 from the data store 154 of the gateway 111. The gateway management instructions 153 can use a configuration loader to transmit activation data 155 to the configuration service 114 in the request to activate the gateway 111. The gateway management instructions 153 can establish a secure connection with the configuration service 114 using the root certificate or other certificate of the configuration service 114. Activation data 155 can include a gateway identifier 156. In some situations, the activation data 155 can also include a enterprise identifier, or include a tuple <Enterprise Identifier, Gateway Identifier>. The configuration service 114 can include a network endpoint or an API that receives activation requests from the gateway management instructions 153. The request to activate the gateway 111 can include a gateway certificate associated with a manufacturer of the gateway 111. The configuration service 114 can receive the request and can authenticate the request using the gateway certificate. The gateway 111 and the configuration service 114 can also authenticate the request by exchanging certificates. The gateway 111 can also receive the configuration service certificate from the configuration service 114, and can authenticate the request using the configuration service certificate.

In step 312, the gateway management instructions 153 can obtain management service data 119. The gateway management instructions 153 can obtain the management service data 119 from the configuration service 114. The management service data 119 that is received can be authenticated using a configuration service certificate received along with the management service data 119. If the gateway enrollment agent 118 is not installed by the bootstrap package, the gateway enrollment agent 118 can also be downloaded from the configuration service 114. The management service data 119 can include a network address, URL, or other communication information for the management service 120. Authentication data for the management service 120 can also be transmitted to the gateway 111. The authentication data can include a root certificate or another certificate associated with the management service 120. In some cases, a gateway enrollment agent 118 can also be transmitted to the gateway 111. The configuration service 114 can transmit a particular version of the gateway enrollment agent 118 that includes the management service data 119 and the authentication data for the management service 120. Alternatively, the gateway enrollment agent 118 can be transmitted separately from the management service data 119.

In some cases, the user can be prompted for credentials that can include user credentials or enrollment credentials 141 once the management service data 119 is obtained from the configuration service 114. User credentials can be credentials for a user account with the management service 120. A user interface element can be generated through which credentials 141 can be entered by a technician or other user. The credentials can be used to establish trust or authenticate with the management service 120. The credentials can also include a username, a password, token, certificate, character string, file, parameter, or other data, and can be linked or associated with a physical token object or hardware token device such as RSA SecurID®. The credentials limited to a predetermined number of uses, for example, a one-time password. The credentials can also be limited to a predetermined time using timeout data.

In step 315, the gateway management instructions 153, for example, the gateway enrollment agent 118, can transmit a request to enroll the gateway 111 with the management service 120. The request to enroll the gateway 111 can include the gateway identifier 156, an organizational group, and other information. The gateway enrollment agent 118 can be configured to communicate with the management service 120, for example, through an enrollment endpoint, address, or URL associated with the management service 120. The gateway enrollment agent 118 can establish a secure connection with the management service 120 using the root certificate or other certificate of the management service 120. In some examples, gateway enrollment agent 118 is limited to performing enrollment and agent update actions. The gateway enrollment agent 118 can receive an enrollment policy from the management service 120 and install the enrollment policy on the gateway 111.

In step 318, the gateway management instructions 153, for example, the gateway enrollment agent 118, can transmit a request to update the gateway enrollment agent 118 to the management service 120. The gateway enrollment agent 118 can receive a command to install the gateway management agent 139 from the management service 120 in response to the request. The command to install the gateway management agent 139 can include a network address or URL to obtain or download the gateway management agent 139. The gateway enrollment agent 118 can implement the command by downloading and installing the gateway management agent 139 to update and replace the gateway enrollment agent 118. In some situations, the gateway enrollment agent 118 can be limited to installing the gateway management agent 139 and installing an enrollment policy. In some cases, gateway credentials 140 associated with the gateway account 138 with the management service 120 are also provided and stored on the gateway 111 by the gateway enrollment agent 118. The gateway credentials 140 can identify the gateway 111 for authentication and communication with the management service 120, for example, upon the gateway management agent 139 checking in or transmitting a request to the management service 120. In some cases, the gateway management agent 139 can be permitted to use the gateway credentials 140 for authentication and communication with the management service 120. The gateway enrollment agent 118 can be restricted from using the gateway credentials 140 for authentication and communication with the management service 120. Once the gateway management agent 139 is received, the enrollment credentials 141 can be deleted or removed from the data store 154. In some cases, the enrollment credentials 141 can be removed once the gateway credentials 140 are received, once communications with the management service 120 are established, or otherwise once the gateway onboarding or gateway enrollment process is completed.

In step 321, the gateway management instructions 153, for example, the gateway management agent 139, can retrieve commands from the management service 120. In some cases, the gateway enrollment agent 118 is limited to enrollment and update actions, while the gateway management agent 139 can install at least one additional product or application other than or in addition to the gateway management agent 139 and can install at least one policy other than or in addition to the enrollment policy. For example, the gateway management agent 139 can be permitted to install a product or policy associated with IoT device management. The gateway enrollment agent 118 can be restricted from installing the product or policy associated with IoT device management.

Figure 4:
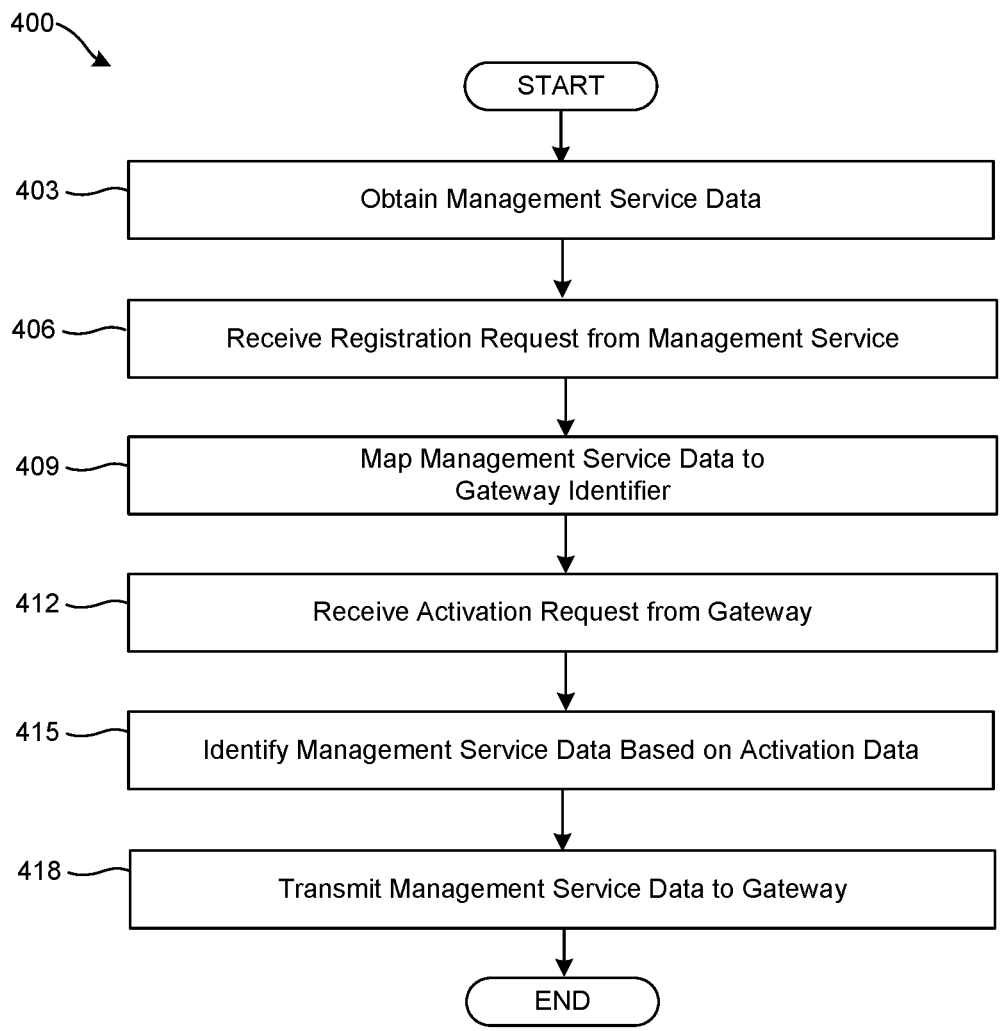

FIG. 4 shows a flowchart 400 that illustrates an example of the operation of the configuration service 114 for onboarding of the gateway 111 with the management service 120 for IoT device management. The onboarding can include enrollment of the gateway 111 with the management service 120 and installation of gateway management agent 139. Onboarding can also include securely providing the gateway 111 with gateway credentials 140 to authenticate the gateway 111 with the management service 120 for IoT device 113 management operations.

In step 403, the configuration service 114 can obtain the management service data 119. The configuration service 114 can generate a user interface through which a configuration administrator enters the management service data 119. The configuration service 114 can also include an API or API call to obtain the management service data 119. The configuration service 114 can receive a request to enter management service data 119. The request can include the management service data 119.

Management Service data 119 that is provided to the configuration service 114 can include a network address, a uniform resource locator (URL), or other information to facilitate communication with the management service 120. For example, an endpoint can be accessed by the gateway enrollment agent 118 through the URL or address of the management service 120, which can include an endpoint of the IoT Center 121. In some examples, the management service data 119 can include an enterprise identifier and an enterprise-specific URL for example, a tuple <Enterprise Identifier, Enterprise IoT Center URL>. The enterprise identifier can be associated with the management service 120, which can be an enterprise-specific management service 120 that is operated by the enterprise. The management service data 119 can also include authentication data to authenticate the gateway 111 with the management service 120. For example, the configuration administrator can post a root certificate to the configuration service 114. The root certificate can be used to authenticate the gateway 111 with the management service 120. The authentication data can also include an enrollment token such as a value, parameter, or file that can be used to authenticate the gateway 111 with the management service 120. In some cases, the management service data 119 can be incorporated into a version of the gateway enrollment agent 118 that is provided to the configuration service 114. In other cases, the configuration service 114 can obtain the management service data 119 separately from the gateway enrollment agent 118.

In step 406, the configuration service 114 can receive a request to register the gateway 111 from the management service 120. The request to register the gateway 111 can include registration data. Registration data can include the gateway data 127, including a gateway identifier 156. The registration data can also include management service data 119 such as a management service identifier, a customer identifier, or an enterprise identifier. The request to register the gateway 111 can include an enterprise identifier and a gateway identifier 156 for example, a tuple <Enterprise Identifier, Gateway Identifier>. The configuration service 114 can include a network endpoint or an API that receives the request to register from the management service 120. The configuration service 114 can determine that the request is transmitted from a management service 120. In some examples, the request can include data that identifies the management service 120. In other situations, the configuration service 114 can identify that the request is transmitted from a management service 120 based on a particular API or network endpoint utilized by the configuration service 114 to receive registration data from management services 120. The configuration service can store registration data for the gateway 111 in the data store 116.

In step 409, the configuration service 114 can map the management service data 119 to the gateway identifier 156 based on the registration request. The configuration service 114 can compare the registration request with the management service data 119 already stored in the data store 116. The configuration service 114 can determine that the enterprise identifier is included in both the registration request and the management service data 119 and can store the gateway identifier 156 in association with the network address, uniform resource locator (URL) or other communication and authentication information of the management service 120.

In step 412, configuration service 114 can receive a request to activate the gateway 111 from the gateway 111. The request can also be considered a request for a gateway enrollment agent 118, for example, when the gateway enrollment agent 118 is to be provided using the configuration service 114. The request to activate the gateway 111 can include activation data 155. Activation data 155 can include a gateway identifier 156. In some situations, the activation data 155 can also include a customer identifier, or include a tuple <Customer Identifier, Gateway Identifier>. The request to activate the gateway 111 can include a gateway certificate associated with a manufacturer of the gateway 111. The configuration service 114 can receive the request and can authenticate the request using the gateway certificate. In some cases, the gateway 111 and the configuration service 114 can also authenticate the request by exchanging certificates. The configuration service 114 can respond with a configuration service certificate from the configuration service 114, and the gateway 111 can authenticate the request using the configuration service certificate. The configuration service 114 can include a network endpoint or an API that receives activation requests from the gateway management instructions 153. The configuration service 114 can determine that the request is transmitted from a gateway 111. For example, the request can include data that identifies the gateway 111 as the provider of the activation data 155. Alternatively, the configuration service 114 can identify that the request is transmitted from a gateway 111 based on a particular API or network endpoint utilized by the configuration service 114 to receive activation data 155 from gateways 111.

In step 415, the configuration service 114 can identify management service data 119 based on the activation request. The configuration service 114 can compare the activation data 155 received in the activation request with the registration data received in the registration request. The configuration service 114 can identify management service data 119 based on the comparison. The activation data 155 can include a gateway identifier 156. The configuration service 114 can identify registration data that also includes the gateway identifier 156 and can identify a management service address, authentication data, and other management service data 119 that is associated with the gateway identifier 156. In some examples, the configuration service 114 can also identify a gateway enrollment agent 118 that is associated with the gateway identifier 156.

In step 418, the configuration service 114 can transmit management service data 119 to the gateway 111. The management service data 119 can include a network address, URL, or other communication information for the management service 120. Authentication data for the management service 120 can also be transmitted to the gateway 111. The authentication data can include a root certificate or another certificate associated with the management service 120. In some cases, a gateway enrollment agent 118 can also be transmitted to the gateway 111. The configuration service 114 can transmit a particular version of the gateway enrollment agent 118 that includes the management service data 119 and authentication data for the management service 120. Alternatively, the gateway enrollment agent 118 can be transmitted separately from the management service data 119. In some examples, the bootstrap package installed on the gateway 111 includes the gateway enrollment agent 118, and it is not transmitted using the configuration service 114. The configuration service 114 can include a configuration service certificate with the management service data 119, and the gateway 111 can authenticate the request using the configuration service certificate.

Figure 5:
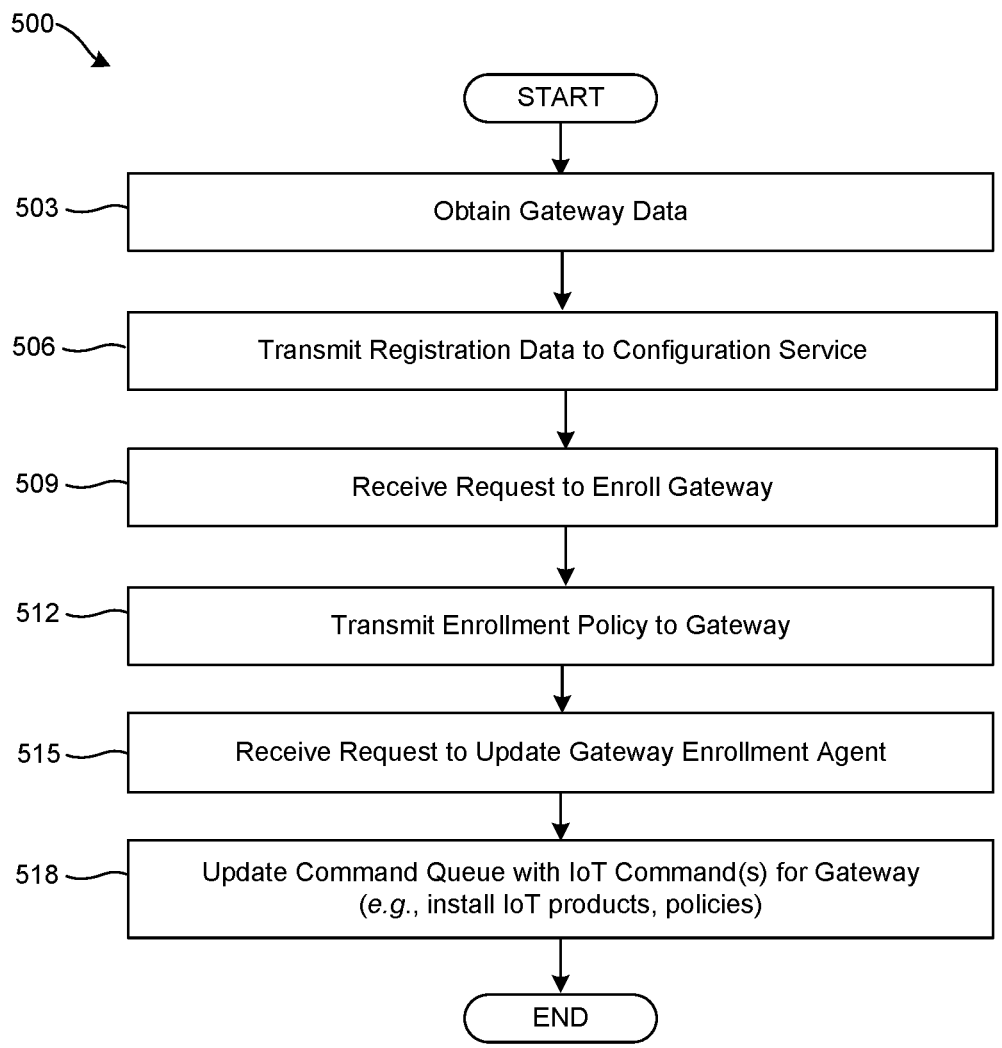

FIG. 5 shows a flowchart 500 that illustrates an example of the operation of the management service 120 for onboarding of the gateway 111 for IoT device management. The onboarding can include enrollment of the gateway 111 with the management service 120 and installation of gateway management agent 139. Onboarding can also include securely providing the gateway 111 with gateway credentials 140 to authenticate the gateway 111 with the management service 120 for IoT device 113 management operations.

In step 503, the management service 120 can obtain gateway data 127. The gateway data 127 can include a manufacturer-assigned serial number or another gateway identifier 156 that uniquely identifies the gateway 111. The gateway data 127 can also include an organizational group associated with the gateway 111. The gateway data 127 can be associated with a gateway account 138 within the management service 120. For example, the management service 120 can generate a user interface through which an enterprise administrator or technician enters the gateway data 127. The management service 120 can also include an API or API call to obtain the management service data 119. The configuration service 114 can receive a request to enter the gateway data 127. The request can include the gateway data 127.

In step 506, the management service 120 can transmit the request to register the gateway 111 to the configuration service 114. The request to register the gateway 111 can include registration data. Registration data can include the gateway data 127, including a gateway identifier 156. The registration data can also include management service data 119 such as a management service identifier, a customer identifier, or an enterprise identifier. The request to register the gateway 111 can include a customer identifier and a gateway identifier 156 for example, a tuple <Customer Identifier, Gateway Identifier>.

In step 509, the management service 120 can receive a request to enroll the gateway 111 with the management service 120 from the gateway enrollment agent 118. The management service 120 can establish a secure connection with the gateway enrollment agent 118 based on the root certificate or other certificate of the management service 120. The request to enroll the gateway 111 can include the gateway identifier 156, an organizational group, and other information. The management service 120 can provide an enrollment endpoint, URL, or address for requests to enroll gateways 111.

In step 512, the management service 120 can transmit an enrollment policy to the gateway 111. The management service 120 can provide the enrollment policy in response to the request to enroll the gateway 111. The management service 120 can place a command to install the enrollment policy in the command queue, and the gateway enrollment agent 118 can retrieve and install the enrollment policy. The management service 120 can also store an indication that the gateway 111 is enrolled. Gateway credentials 140 can be generated and associated with the gateway account 138 in response to a request for enrollment. In some situations, the gateway credentials 140 can be generated at another point in the onboarding process, including upon obtaining a gateway identifier 156 as part of the gateway data 127.

In step 515, the management service 120 can receive a request to update the gateway enrollment agent 118 from the gateway 111. The management service 120 can transmit a command to install the gateway management agent 139 in response to the request. The command to install the gateway management agent 139 can include a network address or URL to obtain or download the gateway management agent 139. The gateway enrollment agent 118 can implement the command by downloading and installing the gateway management agent 139 to update and replace the gateway enrollment agent 118. The management service 120 can transmit gateway credentials 140 to the gateway 111 for authentication and communication with the management service 120, for example, upon the gateway management agent 139 checking in or transmitting a request to the management service 120. In some cases, the gateway management agent 139 can be permitted to use the gateway credentials 140 for authentication and communication with the management service 120. The gateway enrollment agent 118 can be restricted from using the gateway credentials 140 for authentication and communication with the management service 120.

In step 518, the management service 120 can update the command queue with IoT commands for the gateway 111 to implement using the gateway management agent 139. For example, the management service 120 can update the command queue to include a command to install an IoT product associated with IoT device management. The IoT product can include an application 165 to install on an IoT device 113 or an application to install on the gateway 111. The management service can also update the command queue to include a command to install an IoT policy associated with IoT device 113 management. In some cases, the management service 120 can limit the gateway enrollment agent 118 to enrollment and update actions. For example, the management service 120 can place only enrollment and update actions in the command queue until receiving an indication from the gateway 111 that the gateway management agent 139 is installed.

Figure 6A:
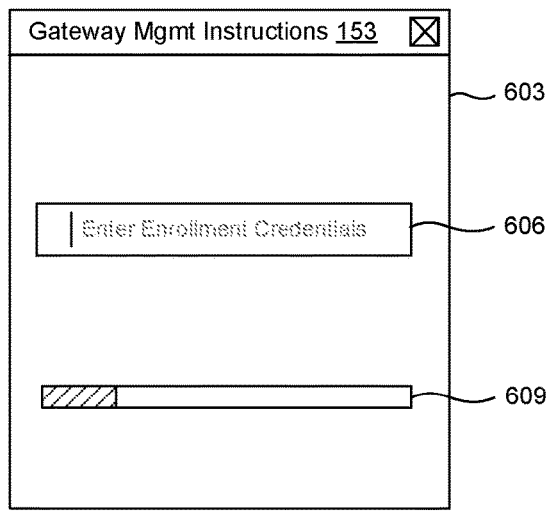
FIGS. 6A and 6B are drawings that illustrate functionality implemented by components of the networked environment and rendered for display.

FIG. 6A is a drawing that illustrates a user interface 603 of the gateway management instructions 153 and rendered for display. The gateway management instructions 153 can generate the user interface 603 for access through a display of the gateway 111, or can generate the user interface for access over the network 112 using a client device 109. The user interface 603 can include a user interface element 606 and a progress indicator 609. Enrollment credentials 141 can be entered through the user interface element 606 by a technician onboarding the gateway 111 or another user. The progress indicator 609 can provide a visual indication of progress of the onboarding process for the gateway 111. The progress indicator 609 can be moved forward or updated once the enrollment credentials 141 are entered, and at each step along the onboarding process for the gateway 111.

Figure 6B:
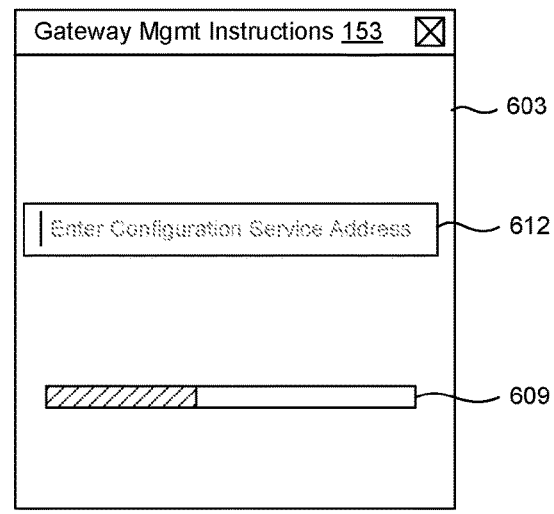

FIG. 6B is a drawing that further illustrates the user interface 603 of the gateway management instructions 153 and rendered for display. In some situations, the gateway management instructions 153 can determine that it does not have access to the configuration service data 157, and can generate a prompt for configuration service data 157 to be entered. For example, the user interface 603 can be updated to include a user interface element 612. A configuration service address can be entered through the user interface element 606 by a technician onboarding the gateway 111 or another user. The user interface 603 can also include the progress indicator 609, which can be updated once the configuration service address is entered, and at each step along the onboarding process for the gateway 111.

Figure 7A:
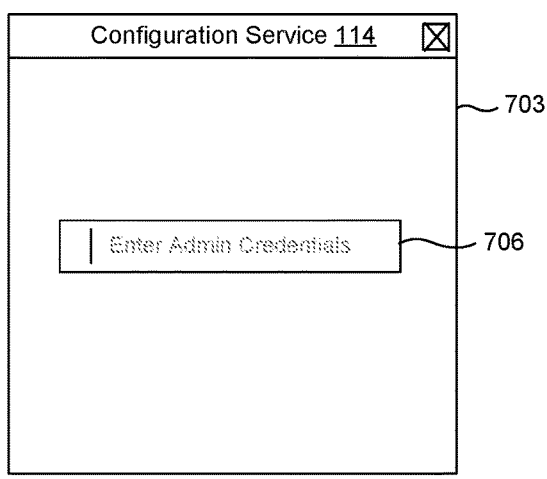
FIGS. 7A and 7B are drawings that illustrate functionality implemented by components of the networked environment and rendered for display.

FIG. 7A is a drawing that illustrates a user interface 703 of the configuration service 114 and rendered for display. The configuration service 114 can generate the user interface 703 for access through a display of the configuration system 103, or can generate the user interface 703 for access over the network 112 using a client device 109. The user interface 703 can include a user interface element 706. Administrative credentials can be entered through the user interface element 706 by an administrator of the configuration service 114 or another user. An administrative user account can have access to the user interface 703 or console of the configuration service 114 based on authentication using administrative credentials that can include one or more of a username, a password, a token, or a certificate.

Figure 7B:
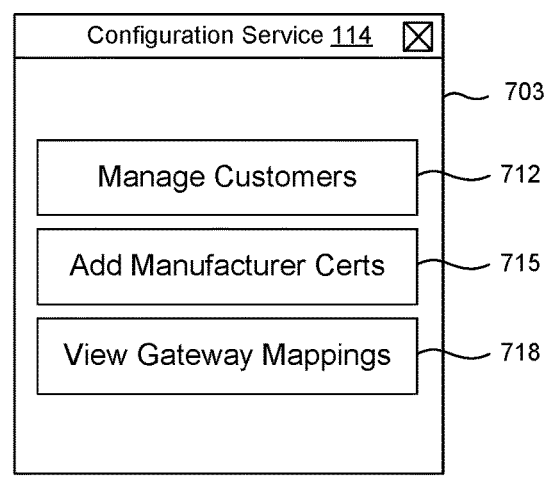

FIG. 7B is a drawing that further illustrates the user interface 703 of the configuration service 114. The user interface 703 can include a user interface element 709, a user interface element 712, a user interface element 715, and a user interface element 718. When selected, the user interface element 712 can cause the user interface 703 to be updated to include functionality that allows an administrator to configure or manage customers or enterprises. For example, a list of customers or enterprises that are registered with the configuration service 114. The list of customers can also include an indication of whether the customer has provided customer-specific URL or network address for a management service 106 associated with the customer. The configuration service 114 can also provide a user interface element through which the customer-specific URL and customer identifier can be entered. A management service certificate associated with a particular management service 106 can also be posted or uploaded to the configuration service through a user interface element.

The user interface element 715 can cause the user interface 703 to be updated to include functionality or a user interface element that allows the administrator to add or upload manufacturer certificates associated with particular manufacturers. In some cases, a URL or network address to obtain the manufacturer certificate can be entered through a user interface element. Manufacturer certificates can also be referred to as gateway certificates associated with a respective manufacturer of the respective gateways 111.

The user interface element 718 can cause the user interface 703 to be updated to include functionality or a user interface element that allows an administrator to view gateway mappings. For example, a gateway 111 can be mapped to a particular manufacturer, and can also be mapped to a particular customer or management service 120. The IoT devices 113, gateways 111, client devices 109, and devices including the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 106 can include a display upon which user interfaces can be rendered. The IoT devices 113, gateways 111, client devices 109, and devices including the management system 106 can also include one or more input/output devices that can include, for example, a capacitive touchscreen or other type of touch input device, fingerprint reader, or keyboard.

Although the management service 120, gateway management instructions 153, gateway management instructions 153, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for gateway onboarding, comprising:
at least one computing device; and
a data store comprising instructions executable by the at least one computing device, the instructions, when executed, causing the at least one computing device to at least:
receive, by a gateway configuration service, management service data comprising: an enterprise identifier for an enterprise that uses a management service to manage a gateway, and a management service address that specifies a network endpoint of the management service;
register, by the gateway configuration service, a gateway in association with the management service data based on receiving a registration request comprising: a gateway identifier, and the enterprise identifier, wherein the gateway configuration service maps the gateway identifier to the management service data based on the enterprise identifier;
receive, by the gateway configuration service, an activation request from the gateway, the activation request comprising the gateway identifier; and
transmit, to the gateway, at least a portion of the management service data based on the activation request being received.

2. The system of claim 1, wherein the management service address comprises an enterprise-specific uniform resource locator (URL) that specifies an enterprise-specific network endpoint of the management service.

3. The system of claim 1, wherein the management service data further comprises a gateway enrollment agent comprising instructions to enroll the gateway with the management service.

4. The system of claim 1, wherein the management service data further comprises authentication data comprising: a management certificate that is used to authenticate the gateway and the gateway configuration service, and an enrollment token that is used to authenticate the gateway with the management service.

5. The system of claim 1, wherein the activation request comprises a configuration service certificate of the gateway configuration service.

6. The system of claim 1, wherein the activation request further comprises the enterprise identifier.

7. The system of claim 1, wherein the gateway configuration service comprises a registration application programming interface (API) that registers the gateway in association with the management service data based on a tuple comprising the gateway identifier, and the enterprise identifier.

8. A non-transitory computer-readable medium embodying instructions executable in at least one computing device, wherein the instructions, when executed, cause the at least one computing device to:
receive, by a gateway configuration service, management service data comprising: an enterprise identifier for an enterprise that uses a management service to manage a gateway, and a management service address that specifies a network endpoint of the management service;
register, by the gateway configuration service, a gateway in association with the management service data based on receiving a registration request comprising: a gateway identifier, and the enterprise identifier, wherein the gateway configuration service maps the gateway identifier to the management service data based on the enterprise identifier;
receive, by the gateway configuration service, an activation request from the gateway, the activation request comprising the gateway identifier; and
transmit, to the gateway, at least a portion of the management service data based on the activation request being received.

9. The non-transitory computer-readable medium of claim 8, wherein the management service address comprises an enterprise-specific uniform resource locator (URL) that specifies an enterprise-specific network endpoint of the management service.

10. The non-transitory computer-readable medium of claim 8, wherein the management service data further comprises a gateway enrollment agent comprising instructions to enroll the gateway with the management service.

11. The non-transitory computer-readable medium of claim 8, wherein the management service data further comprises authentication data comprising: a management certificate that is used to authenticate the gateway and the gateway configuration service, and an enrollment token that is used to authenticate the gateway with the management service.

12. The non-transitory computer-readable medium of claim 8, wherein the activation request comprises a configuration service certificate of the gateway configuration service.

13. The non-transitory computer-readable medium of claim 8, wherein the gateway configuration service comprises a registration application programming interface (API) that registers the gateway in association with the management service data based on a tuple comprising the gateway identifier, and the enterprise identifier.

14. A computer-implemented method, comprising:
  receiving, by a gateway configuration service, management service data comprising: an enterprise identifier for an enterprise that uses a management service to manage a gateway, and a management service address that specifies a network endpoint of the management service;
  registering, by the gateway configuration service, a gateway in association with the management service data based on receiving a registration request comprising: a gateway identifier, and the enterprise identifier, wherein the gateway configuration service maps the gateway identifier to the management service data based on the enterprise identifier;
  receiving, by the gateway configuration service, an activation request from the gateway, the activation request comprising the gateway identifier; and
  transmitting, to the gateway, at least a portion of the management service data based on the activation request being received.

15. The computer-implemented method of claim 14, wherein the management service address comprises an enterprise-specific uniform resource locator (URL) that specifies an enterprise-specific network endpoint of the management service.

16. The computer-implemented method of claim 14, wherein the management service data further comprises a gateway enrollment agent comprising instructions to enroll the gateway with the management service.

17. The computer-implemented method of claim 14, wherein the management service data further comprises authentication data comprising: a management certificate that is used to authenticate the gateway and the gateway configuration service, and an enrollment token that is used to authenticate the gateway with the management service.

18. The computer-implemented method of claim 14, wherein the activation request comprises a configuration service certificate of the gateway configuration service.

19. The computer-implemented method of claim 14, wherein the activation request further comprises the enterprise identifier.

20. The computer-implemented method of claim 14, wherein the gateway configuration service comprises a registration application programming interface (API) that registers the gateway in association with the management service data based on a tuple comprising the gateway identifier, and the enterprise identifier.

\* \* \* \* \*